United States Patent [19]

Plaas-Link

[11] Patent Number: 5,069,768
[45] Date of Patent: Dec. 3, 1991

[54] PROCESS FOR SEPARATING SUBSTANCES PRESENT IN LIQUIDS

[76] Inventor: Andreas Plaas-Link, Langensalzerstr. 5, D-3000 Hannover, Fed. Rep. of Germany

[21] Appl. No.: 636,005

[22] Filed: Jan. 3, 1991

Related U.S. Application Data

[63] Continuation of Ser. No. 347,583, May 5, 1989, abandoned.

[30] Foreign Application Priority Data

May 5, 1988 [DE] Fed. Rep. of Germany ....... 3815296

[51] Int. Cl.$^5$ .......................... B01D 57/02; C25B 7/00
[52] U.S. Cl. .................................. 204/180.1; 204/186; 204/183.2
[58] Field of Search ................ 204/299 R, 302, 180.1, 204/183.2, 186

[56] References Cited

U.S. PATENT DOCUMENTS

| | | | |
|---|---|---|---|
| 1,603,298 | 10/1926 | Speed .............................. | 204/180.1 |
| 2,884,375 | 4/1959 | Seelig et al. ....................... | 208/146 |
| 3,214,362 | 10/1965 | Juda .................................. | 204/299 |
| 3,821,102 | 6/1974 | Fletcher et al. .................... | 204/299 |

*Primary Examiner*—Bernard Nozick
*Attorney, Agent, or Firm*—Shlesinger Arkwright & Garvey

[57] ABSTRACT

Separation of substances present in fluid media can be obtained by directing at an angle of incidence up to 180 degrees, a first flow of fluid medium against a second flow of fluid medium. A boundary layer is formed between the mutually incident media and the substances to be separated pass from the first medium through the boundary layer into the second medium.

8 Claims, 1 Drawing Sheet

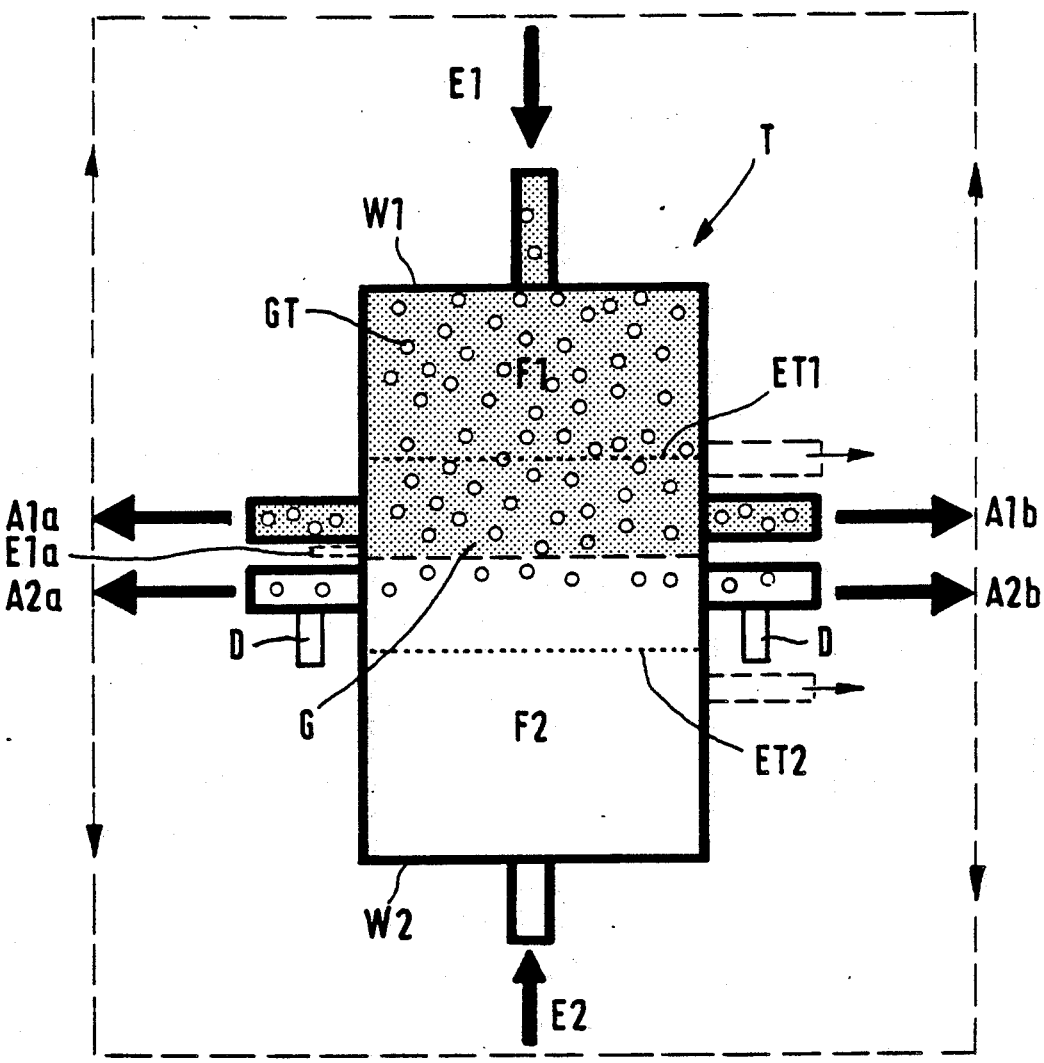

PROCESS FOR SEPARATING SUBSTANCES PRESENT IN LIQUIDS

This application is a continuation of application Ser. No. 07/347,583, filed May 5, 1989, now abandoned.

The invention concerns a process and equipment for separating substances present in gases, in liquids and/or in or at particles.

Methods are widespread for purifying, separating or enriching chemical compounds. Electrophoresis is used for macro-molecules, proteins, organelles or cells. Electrophoresis is restricted in its application by the requirement of a set of intakes and discharge means for the substances which must be separated and the carrier liquid. Moreover electrophoresis is bounded quantitatively and qualitatively by three factors.

In order to avoid convection flows which would degrade separation, the separation gap may not exceed 8 mm-1.2 cm. If this width is exceeded, the liquids no longer can be cooled because of the heating caused by the electrophoretic separation potential in practical work, The slight size of the separation gap in electrophoretic apparatus causes a parabolic flow profile in the liquid which also degrades the separation, Density variations in the liquids to be separated cause convection flow again degrading separation and separation sharpness.

The variously applied electrophoretic methods employed require rigorously monitoring and matching the flow rates of the buffer solutions passing through the separation gap, the separation potential and the positions of the intake and discharge nozzles. This individual matching to particular separation tasks has heretofore prevented wide applicability of electrophoresis as a powerful accessory for instance in bio-technology.

It is the object of the invention to provide a process and equipment of the initially cited kind whereby the above drawbacks are averted and high output and high separation can be achieved.

Moreover the process and the equipment are simple.

The process for separating soluble substances present in liquids is characterized in that a second flow (F2) of liquid representing a second phase subtends an incident angle up to 180° relative to a first flow (F1) of liquid representing a first phase and containing the soluble substance. The soluble substance is transferred through the boundary layer (G) formed between the mutually incident flow or phases (F1 and F2) into the second phase (F2). The application of an electrical separation potential or charge to the boundary layer (G) transversely and the addition of substances to the first phase or the second phase or both phases will facilitate the transfer of the soluble substance from the first phase to the second phase. Organic solvents may be used in either the first phase or the second phase or both to facilitate the transfer of the soluble substance.

A loop is formed when the phase flows into the chamber through intake (E1), for example, and is discharged through outlet (A1A) which is reconnected to introduction port (E1). Efficiency can also be increased when a process is carried out at zero gravity. Additional efficiency may also be obtained when a lesser amount of the phase (F1) containing the soluble substance is introduced laterally near the boundary layer (G). The equipment used to separate the soluble substance present in the liquid is characterized by a flow chamber (T) or vessel having a first intake (E1) for permitting the flow (F1) of a liquid which includes a soluble substance for separation and forms the first phase. A second intake (E2) offset from the first intake and passing a second flow (F2) of liquid forming a second phase. At least one lateral discharge (A1A, A1B, A2A, A2B) for each phase (F1 and F2), is provided on both sides of the boundary layer (G) formed between the two phases (F1, F2). Circulatory flows are obtained when the first phase flow (F1) and/or the discharges (A2A and A2B) of the second phase flow (F2) are fed back into the intakes (E1 and E2). Additional lateral intakes may be provided to introduce additional amounts of the first phase (F1) containing the soluble substance for separation.

The invention achieves substance separation by means of the differential solubility of the materials to be separated in the two phases F1 and F2. BY the dissolution principle, the substances to be separated pass from one phase into the other, illustratively mainly from liquid F1 into liquid F2.

The invention is elucidated below in relation to the attached drawing.

The drawing schematically shows equipment to separate substances from a liquid. The equipment comprises a separation chamber T. On one side, an intake E1 for a first liquid issues into this separation chamber, used for a first liquid F1 containing the substance which must be separated. At the opposite side of the separation chamber there is a second intake E2 for a second liquid F2 that is to receive the substances separated from liquid F1. The two liquids F1 and F2 are introduced through the two intakes and flow inside the separation chamber T in opposite directions toward each other. Where these two liquids meet, a boundary layer G will be formed. On either side of the boundary layer G, discharges A1a and A1b are provided in the side walls of the separation chamber T for the first liquid F1 and discharges A2a and A2b for the liquid F2.

As indicated by the dashed lines 1, 2, 3 and 4, the discharges may be fed back to the intakes the flow in lines designated by dashed lines 1, 2, 3 and 4 is facilitated by pumps (not shown).

The substances from the liquid F1 pass through the boundary layer G into the liquid F2. The separation is carried out because of the differential solubility of the substances being separated in the two liquids F1 and F2.

In order to raise the separation efficiency, grid-electrodes ET1 and ET2 may be provided on both sides of the boundary layer G to which an electric separation potential is applied whereby charged particles shall be moved through the boundary layer G into the liquid F2.

In lieu of separate grid-electrodes, the opposite walls W1 and W2 or parts of these walls may also serve as electrodes. Detectors D may be mounted to the discharges A2a and A2b of the second liquid F2 to ascertain the transition of substances from liquid F1 into liquid F2. The output signal from these detectors also may serve to control the potential across the electrodes Et1 and ET2.

To further control the separation, materials increasing or lowering the surface tension may be introduced into liquid F1 and/or liquid F2. Moreover the liquids may contain organic solvents. Again, the liquids F1 and F2 may be adjusted to different electrolyte concentrations in order to carry out also separation by the method of field-jump electrophoresis.

Lastly the pH of liquid F1 or F2 may be adjusted in such a manner that part of the substances to be separated lack any surface charge and therefore shall not be transported at their iso-electric point.

Moreover further discharge means may be provided at the separation chamber T at different distances from the boundary layer G (shown dashed). It is possible also to provide small lateral intakes Ela (dashed) for the liquid F1 containing the substance which must be separated, whereby lesser amounts of the liquid F1 can be introduced near the boundary layer.

I claim:

1. A process for separating substances present in liquids, comprising the steps of:
   a) providing a reaction vessel having a first surface and a second surface spaced from said first surface,
   b) providing in each of the surfaces an intake opening for facilitating liquid flow into said vessel at substantially oppositely directed flow paths,
   c) introducing a first liquid containing a soluble substance into one of said intake openings,
   d) introducing a second liquid into the other of said intake openings,
   e) forming a boundary layer spaced from said intake openings and forming an interface of the first liquid and the second liquid inside said vessel where contact between the first liquid and the second liquid occurs and forming a stable flow of the first liquid and the second liquid from the intake openings to outlet openings on each side of the boundary layer, and
   f) applying an electrical charge across the boundary layer which causes the soluble substance to be removed from the first liquid to the second liquid without mixing of the first liquid with the second liquid.

2. The process for separating substances present in liquids as set forth in claim 1, further comprising the step of:
   a) adding a surface tension reducing substance to at least one of the liquid media.

3. The process for separating substances in liquids as set forth in claim 1, further comprising the step of:
   a) adding a surface tension increasing substance to at least one of the liquids.

4. The process for separating substances present in liquids as set forth in claim 1, wherein:
   a) at least one of the liquids contains an organic solvent.

5. The process for separating substances present in liquids as set forth in claim 1, wherein:
   a) each of said first liquid and said second liquid flow in a loop.

6. The process for separating substances present in liquids as set forth in claim 1, further comprising the steps of:
   a) adjusting the electrolyte concentrations in the liquids, and
   b) separating out the soluble substance from the second liquid by field-jump electrophoresis.

7. The process for separating substances present in liquids as set forth in claim 1, further comprising the step of:
   a) adjusting the pH value of at least one of the liquids so that the soluble substance lacks surface charges and is thereby not transported by isolectric points.

8. The process for separating substances present in liquids as set forth in claim 1, further comprising the step of:
   a) introducing a lesser amount of the second liquid laterally at a location near the boundary layer.

* * * * *